United States Patent [19]

Kikuchi et al.

[11] Patent Number: 4,815,877
[45] Date of Patent: Mar. 28, 1989

[54] CONTINUOUS SHEET GUIDE MECHANISM

[75] Inventors: Hiroshi Kikuchi; Takashi Itaya, Both of Tokyo, Japan

[73] Assignee: Oki Electric Industry Co., Ltd., Tokyo, Japan

[21] Appl. No.: 59,766

[22] Filed: Jun. 8, 1987

[30] Foreign Application Priority Data

Jun. 16, 1986 [JP] Japan ............................ 61-090539[U]

[51] Int. Cl.$^4$ .............................................. B41J 11/30
[52] U.S. Cl. .................................. 400/616.1; 400/619
[58] Field of Search ................... 400/616.1, 616.2, 619

[56] References Cited

U.S. PATENT DOCUMENTS 4,586,839  5/1986  Iwagami ............................. 400/619
4,655,625  4/1987  Brull et al. ........................... 400/605

Primary Examiner—Paul T. Sewell
Assistant Examiner—James Lisehora
Attorney, Agent, or Firm—Wenderoth, Lind & Ponack

[57] ABSTRACT

A continuous sheet guide mechanism for a printer having a rotatable cylindrical platen and a bottom guide plate disposed below the cylindrical platen forming a sheet guide path therebetween as well as a sheet inlet opening and a sheet outlet opening, a sheet guide plane formed upstream of the bottom guide plate for guiding a sheet into the sheet inlet opening and a pair of tractor units provided near the sheet outlet opening, the tractor units being supported on a fixed support shaft disposed near and parallel to the platen, and on a driving shaft for driving the tractor units, extending parallel to the support shaft. A sheet guide member is slidably mounted on the fixed support shaft and rotatably mounted on the driving shaft, the sheet guide member being composed of an upper gide wall for guiding the continuous sheet wound around the platen, a guide leg depending from the upper guide wall and having an inclined section forming an obtuse angle with the sheet guide plane so as to guide the continuous sheet downward toward a space below the platen and allow the sheet to be wound correctly around the platen. The guide leg includes a supporting section defining a recess which engages the driving shaft and a front end of the supporting section is rounded for guiding the sheet in the upward and reverse directions. The guide mechanism can include a paper separator for separating a sheet being guided from the printer.

5 Claims, 5 Drawing Sheets

CONTINUOUS SHEET GUIDE MECHANISM

BACKGROUND OF THE INVENTION

1. Field of the Invention

The present invention relates to a continuous sheet guide mechanism for guiding a continuous sheet in winding a continuous sheet around the platen of a serial printer and setting the continuous sheet on the tractors of the serial printer.

2. Description of the Prior Art

Referring to FIG. 5 showing the arrangement of conventional tractor units 5 by way of example, on a serial printer, a support shaft 3 is supported on and fixed with screws to side frames 1 and 2, and a driving shaft 4 is journaled for rotation on the side frames 1 and 2. The side frames 1 and 2 are secured to the side frames 7 and 8 of the serial printer, respectively, by locking means, not shown. The pair of pin tractor units 5 are supported slidably on the support shaft 3 on the right and left sides thereof, respectively. A sheet guide member 6 is supported slidably on the support shaft 3 in the middle of the interval between the pin tractor units 5. A platen 9 extends in front of and in parallel to the driving shaft 4. A print head 10 and a ribbon cassette 11 are disposed in front of the platen 9.

Referring to FIG. 6, each tractor unit 5 for guiding a continuous sheet 12 can be fixed at an optional position on the support shaft 3 by means of a locking lever 13. Each of the tractor units 5 has a guide section 14 for guiding the continuous sheet 12 introduced into the serial printer through a sheet inlet opening 15. Each of the tractor units 5 has a driving wheel 16 mounted slidably on the driving shaft 4 for rotation together with the driving shaft 4 to drive a tractor belt 17 extended between the driving wheel 16 and a wheel mounted slidably and rotatably on the support shaft 3. The tractor belt 17 is provided on the outer surface thereof with pins 17a, which engage perforations formed in each side edge of the continuous sheet 12 to guide the continuous sheet 12.

Referring to FIG. 7, the sheet guide member 6 has a supporting leg 6a projecting downward from an upper part of the top guiding section and slidably engaging the fixed support shaft 3, and a protective leg 6b extending downward from a lower part of the top guiding section so as to protect the driving shaft 4.

In introducing the continuous sheet 12 into the serial printer so as to make the tractor units 5 engage the continuous sheet 12, the front edge of the continuous sheet 12 is inserted through the sheet inlet opening 15 in a direction indicated by an arrow A. The lateral movement of the continuous sheet 12 relative to the platen 9 is restricted by the guiding sections 14 of the tractor units 5. The continuous sheet 12 passes around the platen 9 and advances in a direction indicated by an arrow B while the pins 17a of the tractor belts 17 of the tractor units 5 engage the perforations formed in the opposite side edges of the continuous sheet 12, respectively.

As is obvious from FIG. 7, the conventional sheet guide member 6 is unable to guide the continuous sheet 12 downward relative to the platen 9. Therefore, the front edge of the continuous sheet 12 is liable to hit on the platen 9 at a position P (FIG. 7) and is turned upward in a direction indicated by an arrow C. To prevent such movement of the front edge of the continuous sheet 12, the continuous sheet 12 needs to be depressed by hand in introducing the continuous sheet 12 into the serial printer.

SUMMARY OF THE INVENTION

The present invention has been made to overcome the foregoing drawbacks of the conventional sheet guide mechanism.

Accordingly, an object of the present invention is to provide a continuous sheet guide mechanism capable of automatically guiding a continuous sheet in introducing the continuous sheet into the serial printer so that the continuous sheet is wound correctly around the platen and is set properly on the tractor units.

To achieve the object of the invention, the present invention provides a continuous sheet guide mechanism for a serial printer provided with a pair of tractor units supported on a fixed support shaft disposed near and in parallel to a platen and a driving shaft for driving the tractor units extending in parallel to the support shaft, comprising: an upper guide wall for guiding the continuous sheet wound around the platen; a guide leg supported on the upper guide wall, the guide leg having an inclined section for guiding a continuous sheet downward toward a space below the platen, and a supporting section having a recess which engages the driving shaft; and a support leg extending downward from the upper guide wall so as to rest on the rear of the fixed support shaft to hold the continuous sheet guide mechanism in place.

When a continuous sheet is inserted into the serial printer, the inclined section of the guide leg guides the continuous sheet downward toward a space below the platen so that the continuous sheet is wound correctly around the platen. The front end of the guide leg is rounded so that the continuous sheet will not be caught by the front end when the continuous sheet is guided in the reverse direction.

The above and other objects, features and advantages of the present invention will become more apparent from the following description taken in conjunction with the following drawings.

DESCRIPTION OF THE PREFERRED EMBODIMENT

Figure 1:
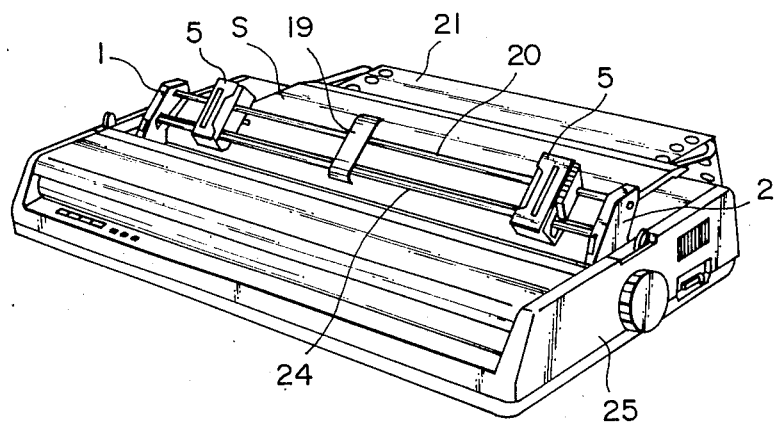
FIG. 1 is a perspective view of a serial printer to which the present invention is applied.
Figure 2:
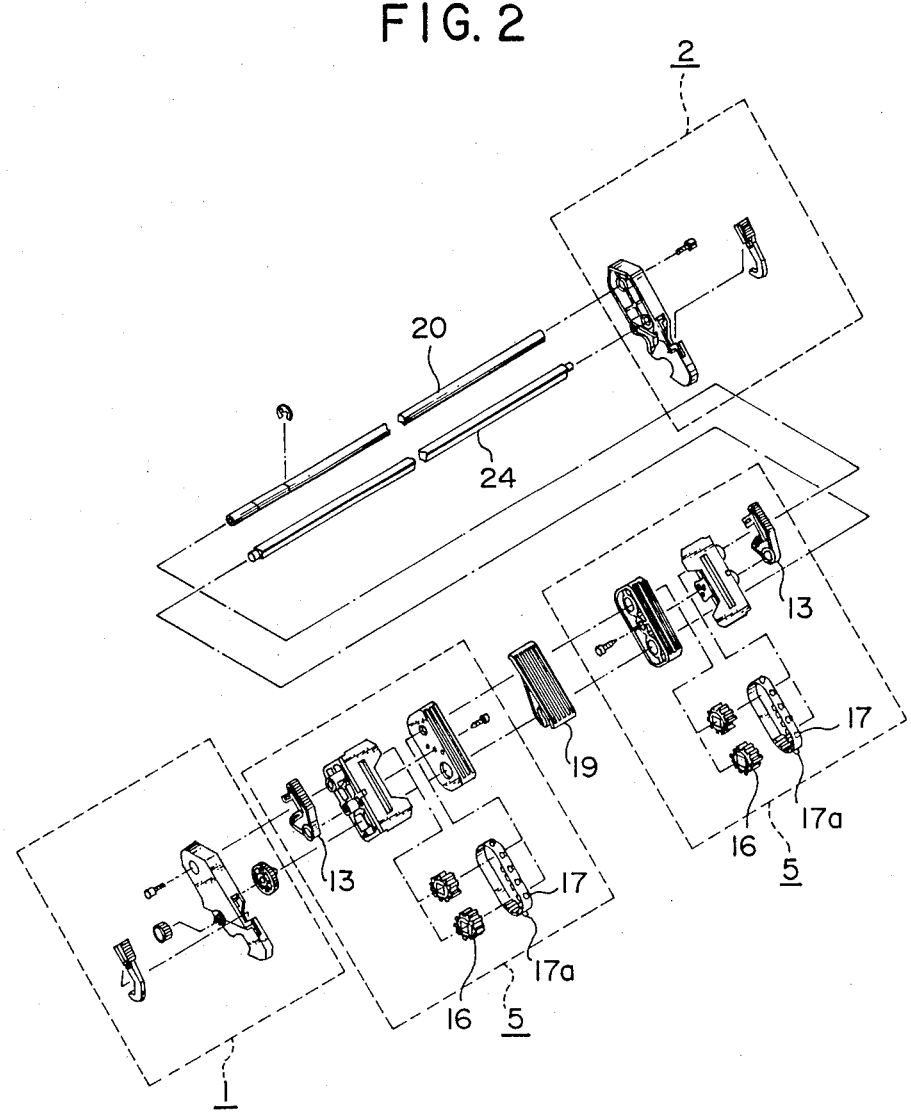
FIG. 2 is an exploded perspective view showing a pair of tractor units employed in the serial printer of FIG. 1.

Referring to FIGS. 1 and 2, a fixed support shaft 20 is supported fixedly at the opposite ends thereof on a pair of brackets 1 and 2 so as to extend in parallel to a rotatable platen 23, not seen in FIGS. 1 and 2. The brackets 1 and 2 are attached to the side frames of a serial printer. A driving shaft 24 is supported rotatably at opposite ends thereof on the brackets 1 and 2 so as to extend in parallel to the fixed support shaft 20. A pair of tractor units 5 are spaced apart and supported on the fixed support shaft 20 and the driving shaft 24 at positions corresponding to the side edges of a continuous sheet which is used on the serial printer, respectively. A continuous sheet guide member 19 embodying the present invention is disposed in the middle of the interval between the tractor units 5 and is supported on the fixed support shaft 20 and the driving shaft 24.

Figure 5:
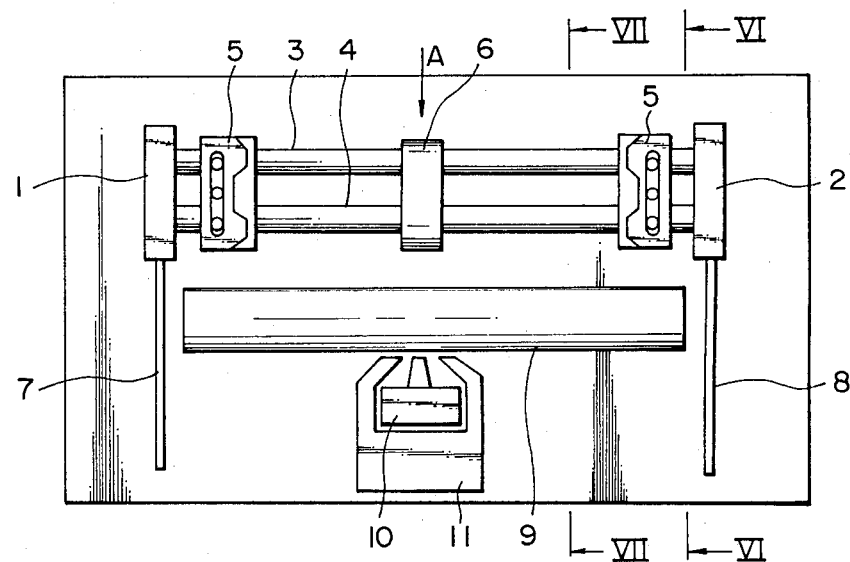
FIG. 5 is a plan view of a conventional serial printer showing the relative disposition of a pair of tractor units, a continuous sheet member, a platen and a printing head.
Figure 6:
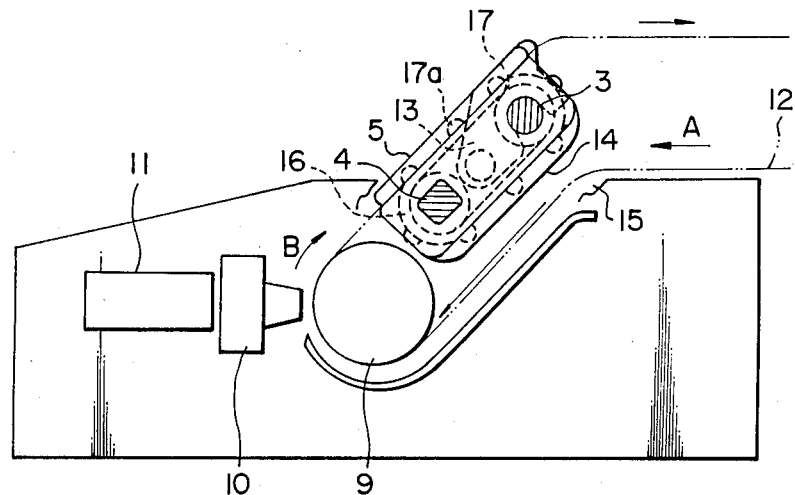
FIG. 6 is a schematic sectional side elevation taken on line VI—VI in FIG. 5.
Figure 7:
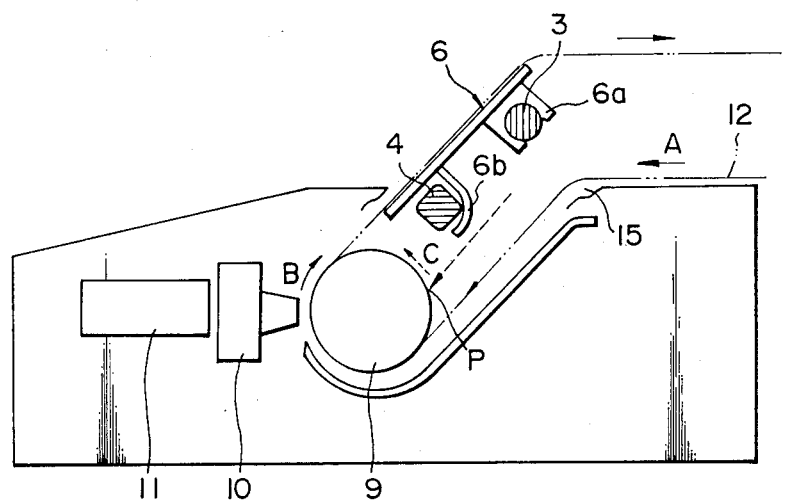
FIG. 7 is a schematic sectional side elevation taken on line VII—VII in FIG. 5.

Referring particularly to FIG. 2, each tractor unit 5 is mounted slidably on the fixed support shaft 20 and the driving shaft 24 is able to be fixed at an appropriate position by means of a locking lever 13. Since the constitution and functions of the tractor units 5 are the same as those of the conventional tractor units as shown in FIGS. 5 and 6, the description thereof will be omitted.

Figure 3:
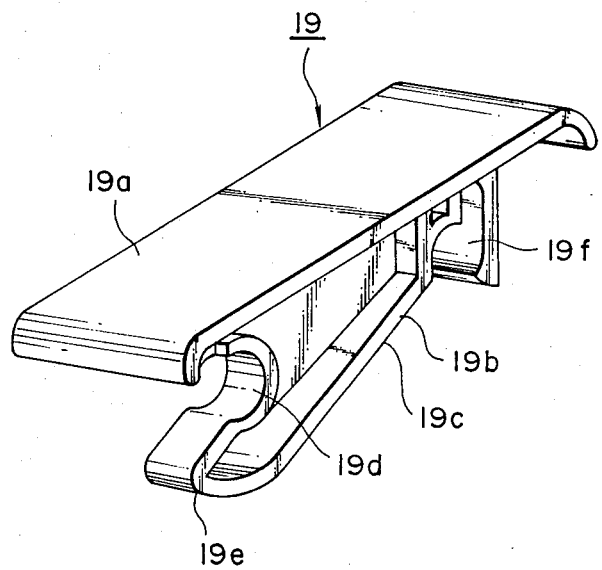
FIG. 3 is a perspective view of a sheet guide member of a continuous sheet guide mechanism in a preferred embodiment, according to the present invention.
Figure 4:
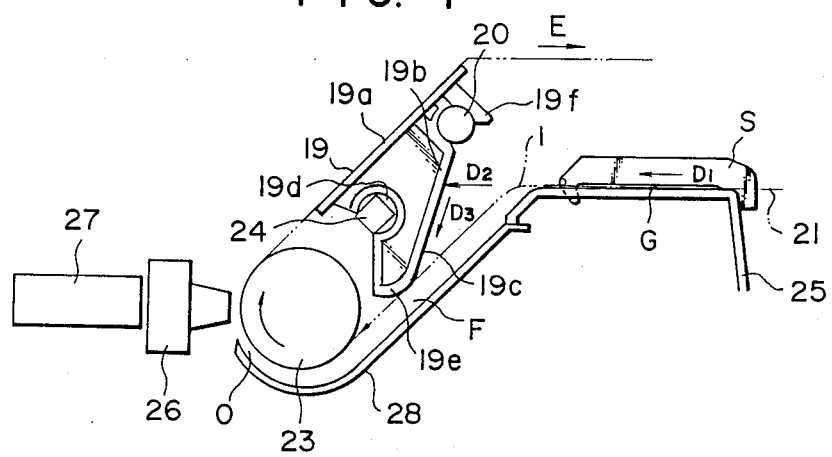
FIG. 4 is a schematic sectional side elevation of assistance in explaining the function of the continuous sheet guide mechanism of FIG. 3.

Referring now to FIGS. 3 and 4 a continuous sheet guiding mechanism comprises a rotatable platen 23, a bottom guide plate 28 of a printer body, a pair of tractors 5 and a sheet guide member 19. The bottom guide plate 28 is disposed below the platen 23 to form a sheet guide path F between the platen 23 and the bottom guide plate 28, a sheet inlet opening I and a sheet outlet opening O.

A sheet guide plane G is formed before or upsteam of the bottom guide plate 28 for guiding a continuous sheet 21 into the sheet inlet opening I. The continuous sheet guide member 19 comprises an upper guide wall 19a for guiding the continuous sheet 21 wound around the platen, a guide leg 19b having an inclined section 19c for guiding the continuous sheet 21 downward toward a space below the platen 23 of the serial printer and a supporting section 19d having a substantially round recess or C-shaped opening which slidably and rotatably receives the driving shaft 24, and a support leg 19f extending downward from the upper guide wall 19a so as to rest on the rear of the fixed support shaft 20 received in a recess defined by the support leg 19f and the rear end of the guide leg 19b. The front end 19e of the guide leg 19b is rounded so that the continuous sheet 21 can be moved smoothly in the reverse direction. The continuous sheet guide member 19 is mounted so as to be axially slidable on the fixed support shaft 20 and the driving shaft 24.

Referring to FIG. 4, in inserting the continuous sheet 21 into the serial printer through the sheet inlet opening I in a direction indicated by an arrow D1, the continuous sheet 21 is restrained from lateral movement by a pair of guide plates, not shown, of the tractor units 5. The continuous sheet 21 advances in a direction indicated by an arrow D2 and the front edge thereof hits on the continuous sheet guide member 19. Then, the central portion of the continuous sheet 21 is guided by the inclined section 19c of the continuous sheet guide member 19 in a direction indicated by an arrow D3 toward the space formed between the platen 23 and the bottom guide plate 28. Thus, the continuous sheet 21 advances along the inclined section 19c of the guide leg 19b, and then the continuous sheet 21 is guided downward toward the space below the platen 23, then guided upward by being guided along the bottom guide plate 28 so as to wind around the platen 23. After winding around the platen 23, the continuous sheet 21 moves along the upper surface of the upper guide wall 19a of the continuous sheet guide member 19 while perforations formed in the opposite side edges of the continuous sheet 21 engage the pins of the tractor units 5. Since the front end 19e of the guide leg 19b is rounded, perforated lines and folds formed in the continuous sheet 21 will not be caught by the front end 19e of the guide leg 19b when the continuous sheet 21 is moved in the reverse direction.

In another embodiment, the continuous sheet guide mechanism further includes a paper separator S disposed on the sheet guide plane G and separated from the upper surface of the printer 25 by a gap for separating the sheet being guided from the surface of the printer 25.

As apparent from the foregoing description, according to the present invention, the inclined section 19c of the guide leg 19b guides the continuous sheet 21 properly toward a space between the platen 23 and the bottom guide plate 28 of the serial printer so that the front edge of the continuous sheet 21 will not be turned up by the platen 23 in the wrong direction. Accordingly, the continuous sheet 21 can be automatically inserted into the serial printer without requiring any auxiliary manual handling of the continuous sheet 21. Furthermore, the rounded front end of the guide leg enables smooth reverse movement of the continuous sheet.

Although the invention has been described in its preferred embodiment with a certain degree of particularity, it is to be understood by those skilled in the art that many changes and variations are possible in the invention without departing from the scope and spirit thereof.

What is claimed is:

1. A continuous sheet guide mechanism comprising:
   a rotatable cylindrical platen;
   a bottom guide plate disposed below said cylindrical platen, said bottom guide plate forming a sheet guide path between said cylindrical plate and said bottom guide plate, a sheet inlet opening and a sheet outlet opening,
   means comprising a sheet guide plane located upstream of said bottom guide plate with respect to a feed direction of a continuous sheet fed to said platen, for guiding a sheet into said sheet inlet opening;
   a pair of spaced-apart tractor units provided near the sheet outlet opening of said sheet guide path, said tractor units being supported on a fixed support shaft disposed near and parallel to said platen and on a driving shaft for driving said tractor units, extending parallel to said support shaft; and
   a sheet guide member disposed between said spaced-apart tractor units, said sheet guide member being slidably mounted on said fixed support shaft and rotatably receiving said driving shaft, said sheet guide member including means comprising an upper guide wall for guiding a continuous sheet after it has been wound around the platen, means for guiding the continuous sheet downward toward a space below said platen and allowing the sheet to be wound around said platen, said guiding means comprising a guide leg having an inclined section which intersects said sheet guide plane thereby forming an obtuse angle relative to said sheet guide plane on a side of said sheet guide plane facing said platen, said guide leg further including means comprising a supporting section defining a recess which rotatably receives said driving shaft, and said guide leg having means comprising a curved portion connecting said inclined section to said supporting section for guiding the sheet when driven backwards along said sheet guide path towards said sheet inlet opening.

2. A continuous sheet guide mechanism for a printer comprising:

a rotatable cylindrical platen;

a bottom guide plate disposed below said cylindrical platen, said bottom guide plate forming a sheet guide path between said cylindrical platen and said bottom guide plate, a sheet inlet opening and a sheet outlet opening;

means comprising a sheet guide plate located upstream of said bottom guide plate with respect to a feed direction of a continuous sheet fed to said platen, for guiding a sheet into said sheet inlet opening;

a paper separator disposed on a side of said sheet guide plane, facing away from said platen, said paper separator being separated from an upper surface of a printer to form a gap for guiding the sheet parallel to the upper surface of said printer;

a pair of spaced-apart tractor units provided near the sheet outlet opening of said sheet guide path, said tractor units being supported on a fixed support shaft disposed adjacent to and parallel to the platen and on a driving shaft for driving said tractor units, extending parallel to said support shaft; and a sheet guide member disposed between said spaced-apart tractor units, said sheet guide member being slidably mounted on said fixed support shaft and rotatably receiving said driving shaft, said sheet guide member including means comprising an upper guide wall for guiding a continuous sheet after it has been wound around the platen, means for guiding the continuous sheet downward toward the space below said platen and allowing the sheet to be wound around said platen, said guiding means comprising a guide leg having an inclined section which intersects said sheet guide plane thereby forming an obtuse angle relative to said sheet guide plane on a side of said sheet guide plane facing said platen, said guide leg further including means comprising a supporting section defining a recess which rotatably receives said driving shaft, and said guide leg having means comprising a curved portion connecting said inclined section to said supporting section for guiding the sheet when driven backwards along said sheet guide path towards said sheet inlet opening.

3. A sheet guide member for a printer having a rotatable cylindrical platen, a bottom guide plate disposed below the cylindrical platen so as to form a sheet guide path therebetween with a sheet inlet opening at an upstream end of the sheet guide path and a sheet outlet opening at a downstream end of the sheet guide path, a sheet guide plane located upstream of the bottom guide plate and a pair of spaced-apart tractor units located adjacent the sheet outlet opening, the tractor units being supported on a fixed support shaft which is adjacent to and extends in a direction parallel to the cylindrical platen and on a driving shaft which extends in a direction parallel to the support shaft, the sheet guide member comprising:

means for mounting said sheet guide member on the support shaft so that said sheet guide member is slidable along the support shaft to any desired position between the tractor units;

means comprising an upper guide wall for guiding a continuous sheet after it has passed along the sheet guide path and through the sheet outlet opening as well as over the cylindrical platen;

means for guiding the continuous sheet downward toward a space below the cylindrical platen so that the sheet is passed around the cylindrical platen, said guiding means comprising a guide leg extending from said upper guide wall, said guide leg including an inclined section and a supporting section, said inclined section having a rectilinearly extending surface which intersects with said sheet guide plane and forms an obtuse angle with the sheet guide plane on a side of the sheet guide plane facing the cylindrical platen when said sheet guide member is mounted in an operating position on the printer, said supporting section including a recess sized to rotatably receive the driving shaft, said guide leg further including means comprising a curved section interconnecting said supporting section to said inclined section for guiding the sheet towards the sheet inlet opening when the sheet is driven backwards along the sheet guide path towards the sheet inlet opening.

4. The sheet guide member of claim 3, wherein said mounting means comprises said guide leg and a support leg extending from said upper guide wall at a position adjacent said guide leg with a space therebetween in which the support shaft is received.

5. The sheet guide member of claim 4, wherein said rectilinearly extending surface of said inclined section extends from said space between said guide leg and said support leg to said curved section interconnecting said supporting section with said inclined section, said guide leg comprising a single member extending perpendicularly from said upper guide wall from a point adjacent said driving shaft to a point adjacent said supporting shaft.

* * * * *